United States Patent [19]

Draper

[11] Patent Number: 4,786,101

[45] Date of Patent: * Nov. 22, 1988

[54] EXTERNALLY RETRACTABLE SUNROOF ASSEMBLY

[75] Inventor: David L. Draper, Whitmore Lake, Mich.

[73] Assignee: Cars & Concepts, Inc., Brighton, Mich.

[*] Notice: The portion of the term of this patent subsequent to Sep. 22, 2004 has been disclaimed.

[21] Appl. No.: 49,134

[22] Filed: May 12, 1987

Related U.S. Application Data

[63] Continuation of Ser. No. 866,595, May 23, 1986, Pat. No. 4,695,090.

[51] Int. Cl.$^4$ .............................................. B60J 7/047
[52] U.S. Cl. ..................................... 296/216; 296/210; 296/220
[58] Field of Search .... 296/210, 216, 146 (U.S. only), 296/218, 220

[56] References Cited

U.S. PATENT DOCUMENTS

| | | | |
|---|---|---|---|
| 1,746,349 | 2/1930 | Hammond | 296/216 |
| 2,482,429 | 9/1949 | Mobbs et al. | 296/222 |
| 4,378,130 | 3/1983 | Shimizu | 296/208 |
| 4,473,252 | 9/1984 | Tomforde et al. | 296/146 |
| 4,624,501 | 11/1986 | Niwa et al. | 296/222 |
| 4,695,090 | 9/1987 | Draper | 296/216 |

FOREIGN PATENT DOCUMENTS

| | | | |
|---|---|---|---|
| 3329406 | 2/1985 | Fed. Rep. of Germany | 296/218 |
| 0085713 | 5/1983 | Japan | 296/216 |
| 0199274 | 11/1983 | Japan | 296/210 |
| 0100016 | 6/1984 | Japan | 296/216 |

Primary Examiner—Dennis H. Pedder
Attorney, Agent, or Firm—Brooks & Kushman

[57] ABSTRACT

An externally retractable sunroof assembly (14) is mounted on a vehicle roof (12) between upper edges of side doors (24). A roof opening (60) in the outer roof panel (32) has forward and rearward edges and has side edges exposing the interior of the roof side rails (44) in each of which a track (68) is respectively mounted. A sunroof (70) has side edges (72) respectively mounted by the pair of tracks within the side rails and is movable between a closed position closing the roof opening and an externally retracted position above the outer roof panel to the rear of the roof opening. The sunroof (70) is made from metal or glass and has the side edges thereof in the closed position located adjacent the upper edges of the side doors to provide a continuous door-to-door appearance. The longitudinal and lateral dimensions of the sunroof (70) with the construction disclosed provide maximum roof opening while still permitting storage of the opened sunroof on the roof. The sunroof assembly (14) is installed by cutting the roof opening (60) in the outer roof panel (32) of the manufactured vehicle without any other structural removal so as to maintain the strength of the roof.

7 Claims, 2 Drawing Sheets

Fig. 3
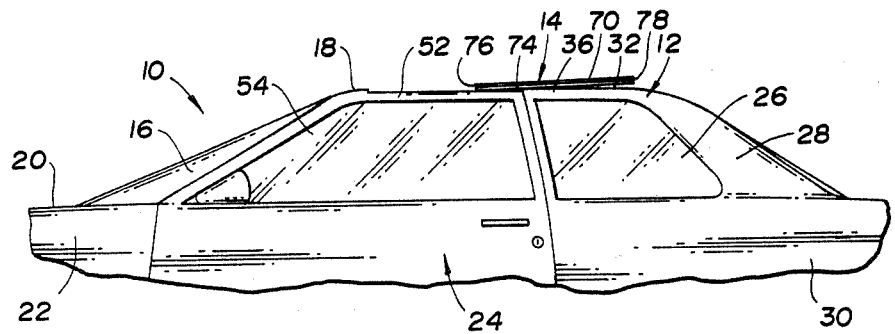
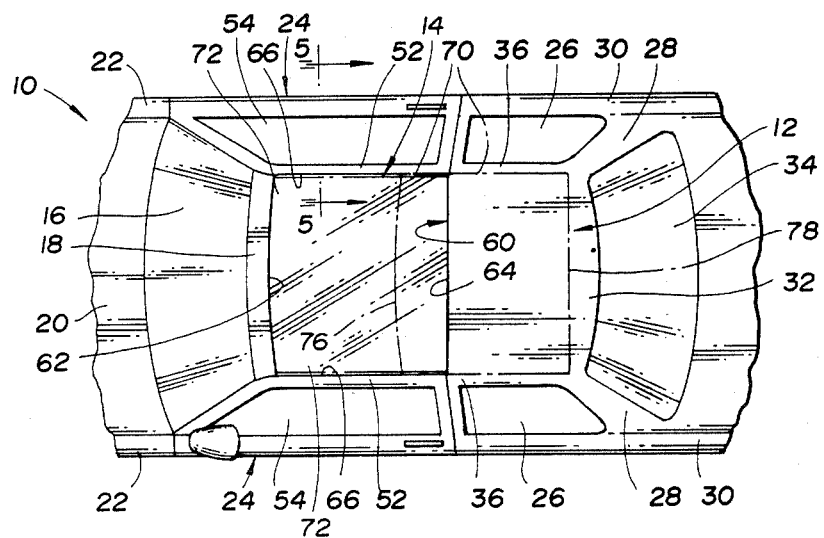
Fig. 4
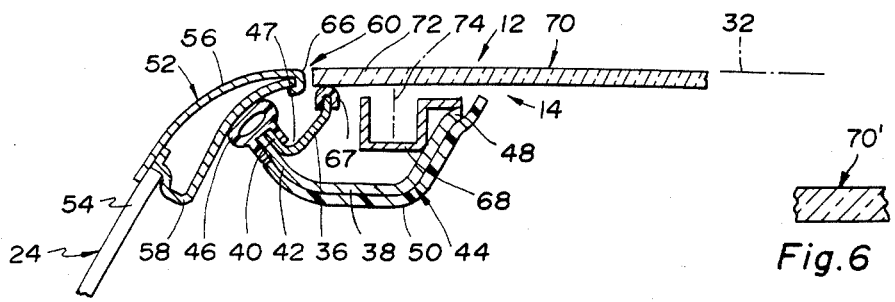
Fig. 5
Fig. 6

EXTERNALLY RETRACTABLE SUNROOF ASSEMBLY

This is a continuation of application Ser. No. 866,595 filed on May 23, 1986, and which issued on Sept. 22, 1987, as U.S. Pat. No. 4,695,090.

This invention relates to an externally retractable sunroof assembly for a vehicle body roof.

BACKGROUND ART

Vehicle body sunroof assemblies have been used for quite some time to provide partial opening of vehicle body roofs in order to increase ventilation and to also provide the roof with a somewhat convertible-like capability of opening the vehicle occupant compartment. With some sunroof assemblies, the sunroof has a front edge that is secured to the roof and a rear edge that is movable upwardly from a closed position to an open position under the control of a latch mechanism. With other sunroof assemblies, the sunroof is mounted for longitudinal movement between a forward position closing the roof opening and a rearwardly retracted position below the roof to the rear of the roof opening such that the roof opening is partially opened to the environment. Examples of these two types of sunroof assemblies are disclosed by U.S. Pat. Nos. 4,005,901; 4,038,910; 4,085,965; 4,103,962; 4,126,352; 4,350,385; 4,403,805; 4,523,785; and 4,541,665.

In some roof constructions, there is insufficient room for a sunroof assembly of the rearwardly retractable type to have its sunroof stored below the roof in the rearwardly retracted position. To overcome this problem, it has previously been proposed to have the sunroof stored externally at a location above the roof in the rearwardly retracted position. Examples of such externally retractable sunroof assemblies are disclosed by U.S. Pat. Nos. 3,993,348; 4,005,900; 4,043,590; 4,407,541; 4,426,112; 4,463,983; and 4,475,767.

Vehicle sunroof assemblies as described above are conventionally mounted on a vehicle roof by cutting an opening through the outer roof panel over the front seat area that is selectively opened and closed by the sunroof. The lateral dimension of such sunroof assemblies is limited by the fact that the roof opening cut has to be located at each lateral side inboard from the adjacent side rail that defines the edge of the roof. Such side rails are conventionally defined by the adjacent side edge of the outer roof panel and by an inner rail that cooperates with the side edge to provide a hollow side rail for rigidifying the roof in order to provide the vehicle with structural integrity. The limitation on lateral width of sunroof assemblies is a particular problem with a recently introduced type of vehicle body wherein side door window frames have outer members that continue the contour of the outer roof panels at their side edges rather than being located below drip rails at the side edges of the roof. With this type of vehicle body construction, the side rails are located farther inboard than with the drip rail type of roof construction and there is thus less lateral space for the sunroof assembly to be mounted within an opening through the outer roof panel.

Vehicle T-roofs that have recently received commercial acceptance are illustrated by U.S. Pat. Nos. 4,120,529; 4,138,155; 4,287,654; and 4,475,766. Such T-roofs conventionally include a pair of removable roof panels that are located on opposite sides of a central strut extending between the windshield header and a rear roof portion. In a closed position, the roof panels extend between the windshield header and the rear roof portion outwardly in opposite directions from the strut and each roof panel defines the adjacent outer side edge of the roof at which an associated unframed side door window is sealed by a seal provided on the roof panel. Most conventional types of T-roofs have the roof panels made of metal or of glass that is usually tinted to reduce the transmission of solar heat into the vehicle occupant compartment. At their inboard edges as disclosed by the above mentioned patents, the T-roof panels are located relatively close to each other so as to provide the general appearance of continuity of the panels from one side door to the other, which is an aesthetically appealing design. It has not been previously possible to incorporate any door-to-door continuous panel appearance with sunroof assemblies as has been done with T-roofs since the opening cut into the roof for a sunroof assembly has to be located inboard from the side rails as described above.

DISCLOSURE OF INVENTION

An object of the present invention is to provide an improved externally retractable sunroof assembly for a vehicle body. In carrying out this object, the vehicle body in which the invention is incorporated includes an outer roof panel having side edges and also has inner rails that cooperate with the side edges of the outer roof panel to provide a pair of hollow side rails. The vehicle body has side doors with upper edges located adjacent the side edges of the outer roof panel with the side doors in a closed position.

The construction of the externally retractable roof assembly of the invention includes a roof opening that is provided in the outer roof panel of the vehicle body and has forward and rearward edges as well as having side edges exposing the interior of the side rails of the roof. A track is mounted within each side rail at each lateral side of the roof. A sunroof of the assembly has side edge portions extending over the side rails and respectively mounted by the pair of tracks therein for movement between a closed position closing the roof opening and an externally retracted position above the outer roof panel to the rear of the roof to thereby open the roof opening. The side edges of the sunroof in its closed position closing the roof opening are juxtaposed with respect to the upper edges of the closed side doors to provide the roof with a continuous door-to-door appearance that is aesthetically appealing.

Any conventional type of track assembly can be utilized with the sunroof and the tracks mounted within the roof side rails to provide the sunroof movement between the closed and externally retracted positions. The lateral width of the sunroof assembly can be much greater than with conventional sunroofs since the roof opening does not have to have its lateral edges located inboard from the side rails as is necessary with conventional types of sunroof assemblies. As such, a greater extent of roof opening is possible than with conventional sunroof assemblies.

In the preferred construction, the sunroof is made from metal or from glass that will normally be tinted to reduce solar heating of the vehicle occupant compartment.

Preferably, the roof opening and the sunroof have a longitudinal length that is a major portion of the longitudinal length of the roof. A front portion of the sunroof overlaps the rearward edge of the roof opening in the retracted position where the sunroof extends rearwardly above the outer roof panel of the roof. A rear portion of the sunroof extends to generally adjacent the rear extremity of the roof in the externally retracted position such that the construction of the roof and the sunroof maximizes the opening of the roof in both lateral and longitudinal directions. The rear portion of the sunroof in the retracted position may also extend slightly beyond the roof panel adjacent the rear extremity thereof in an overhanging relationship.

The objects, features, and advantages of the present invention are readily apparent from the following detailed description of the best mode for carrying out the invention when taken in connection with the accompanying drawings.

BRIEF DESCRIPTION OF DRAWINGS

FIG. 3 is a partial side view of the vehicle body with the sunroof shown in the externally retracted position;

FIG. 4 is a top plan view of the vehicle body showing the sunroof in the closed position by solid line representation and in the externally retracted position by phantom line representation;

FIG. 5 is a sectional view taken along the direction of line 5—5 in FIG. 4 to illustrate the construction of the vehicle body and its sunroof assembly; and FIG. 6 is a partial view showing the sunroof made of glass.

BEST MODE FOR CARRYING OUT THE INVENTION

Figure 1:
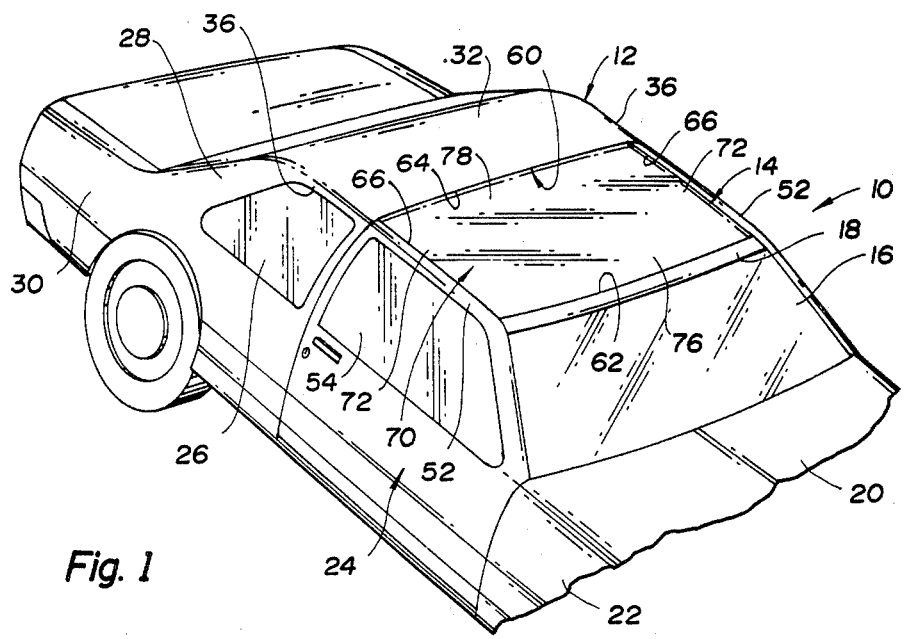
FIG. 1 is a partial perspective view of a vehicle body including an externally retractable sunroof assembly that is constructed in accordance with the present invention and illustrated with the sunroof thereof in a closed position.

With reference to FIGS. 1 and 3 of the drawings, a vehicle body generally indicated by 10 includes a roof 12 on which an externally retractable sunroof assembly 14 is mounted as is hereinafter more fully described. The vehicle body 10 includes a windshield 16 whose upper edge is supported by a windshield header 18 and whose lower edge is located rearwardly of the hood 20 which is located between the conventional front fenders 22. A pair of side doors 24 are located rearwardly of the front fenders 22 as also shown in FIG. 4 on opposite sides of the externally retractable sunroof assembly 14, and the side doors have upper edges located adjacent the side edges of the outer roof panel in the door closed position. While the invention is illustrated with a vehicle body of the two door type, it should be appreciated that the externally retractable sunroof assembly 14 can also be used with a vehicle body of the four door type having front and rear doors at each side. Thus, rather than having fixed rear quarter windows 26 as illustrated at the rear of each door 24, there could also be a rear door with a rear door window if a four door type vehicle were utilized. As illustrated, a sail panel 28 extends upwardly from each rear fender 30 and is connected to an outer roof panel 32 of roof 12 forward of the backlite 34 shown in FIG. 4.

As illustrated in FIGS. 4 and 5, the outer roof panel 32 has side edges 36 (FIG. 4) and the roof 12 has inner rails 38 (FIG. 5) at its opposite lateral sides. A distal flange 40 of the roof panel side edges 36 and a distal flange 42 of the inner rail 38 are welded to each other such that the inner rail cooperates with the roof panel to define an associated hollow side rail 44 at the adjacent side of the roof. Flanges 40 and 42 support a seal 46 that seals against the side door 24 in the door closed position. Seal 46 and the roof panel side edge 36 form the conventional water drain area 47 which is concealed from sight with the door 24 closed. At its inboard side, the inner rail 38 has a flange 48 that is spaced from the outer roof panel 32 in a conventional fashion. The entire side rail 44 is also covered by the headliner 50 of the vehicle occupant compartment to provide an aesthetically appealing appearance.

With combined reference to FIGS. 3, 4, and 5, the side doors 24 of the vehicle body in which the sunroof 14 is incorporated are illustrated as having upper window frames 52 which extend around the associated door window 54 at its front, top, and rear extremities. In the illustrated closed position of each side door 24 as shown in FIGS. 3 and 4, the window frame 52 covers the front A pillar at each lateral side of the windshield 16 and continues the exposed contour of the outer roof panel at the side edges thereof before installation of the externally retractable sunroof assembly 14. As shown in FIG. 5, each window frame 52 includes outer and inner frame members 56 and 58 secured to each other in any conventional manner to cooperate in providing the window frame 52.

As best illustrated in FIG. 4, the externally retractable sunroof assembly 14 of the invention incorporates a roof opening 60 in the outer roof panel 32. This roof opening 60 is preferably provided by cutting the roof panel after the completion of the vehicle manufacturing. The roof opening 60 has a forward edge 62 along the windshield header 18 and has a rearward edge 64 that extends laterally generally in alignment with the rear edges of the side doors 24 as illustrated in FIG. 4. Side edges 66 of the roof opening 60 shown in FIG. 4 expose the interior of the side rails 44 as shown in FIG. 5. The cut side edge 36 of each side rail 44 is provided with a trim seal 67 that is secured thereto in any suitable manner. A track 68 is mounted within the each side rail 44 extending longitudinally with respect to the vehicle.

Figure 2:
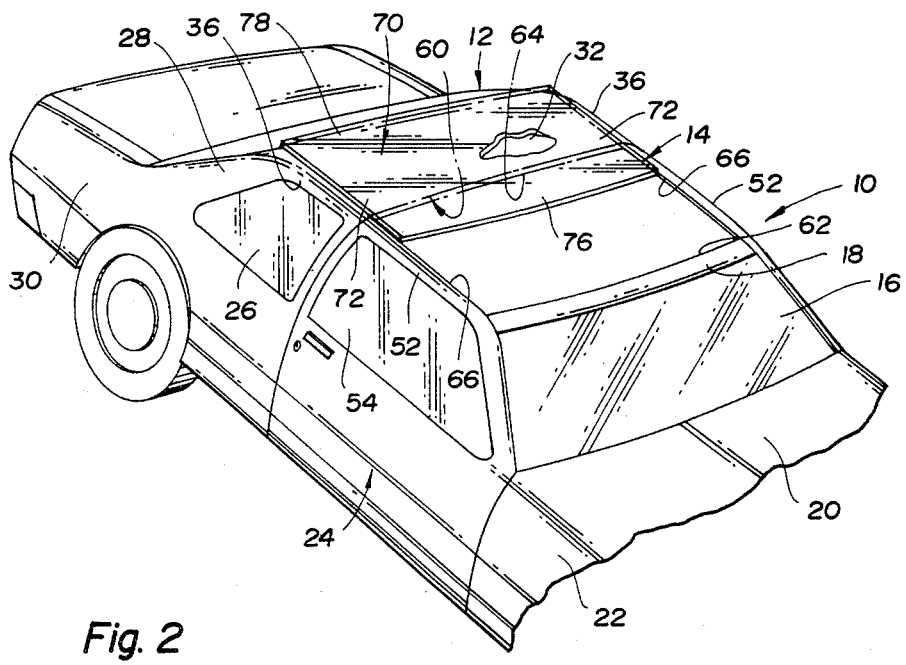
FIG. 2 is a partial perspective view of the vehicle body with the externally retractable sunroof and is similar to FIG. 1 but is shown with the sunroof in its externally retracted position.

A sunroof 70 of sunroof assembly 14 has side edge portions 72 extending over the side rails 44 and respectively mounted on the pair of tracks 68 therein by any conventional type of track mechanism as schematically illustrated by 74 in FIG. 5. The sunroof 70 is movable along the tracks 68 within the side rails 44 between a closed position as illustrated in FIG. 1 closing the roof opening 60 and an externally retracted position above the outer roof panel 32 to the rear of the roof opening as illustrated in FIGS. 2 and 3 such that the roof opening is open to the environment. In the closed position, the side edge portions 72 of the sunroof 70 engage the trim seals 67 on the side rails 44 to provide sealing of the vehicle occupant compartment from the environment.

In the preferred construction, the sunroof 70 is made from metal as shown in FIG. 5 or from glass as shown by the partial sunroof 70' in FIG. 6 which is most preferably tinted so as to reduce the transmission of solar heat into the vehicle body occupant compartment. In the closed position of the sunroof 70 as best illustrated in FIG. 4, the side edges 72 of the sunroof are respectively juxtaposed with respect to the upper edges of the side doors 24 to provide the roof with a continuous door-to-door appearance that is aesthetically appealing.

As illustrated by continuing reference to FIG. 4, the roof opening 60 and the sunroof 70 each have a longitudinal length that is a major portion of the longitudinal length of the roof 12 between the windshield header 18 and the backlite 34. In the externally retracted position illustrated by phantom line representation, the sunroof 70 has a front portion 76 that overlaps the rearward edge 64 of the roof opening 60 and also has a rear portion 78 that extends to generally adjacent the rear extremity of the roof. It is also possible for the rear portion 78 of sunroof 70 in the retracted position to extend slightly beyond the roof panel 32 adjacent the rear extremity thereof in an overhanging relationship. The track mechanism 74 (FIG. 5) that mounts the sunroof 70 on the tracks 68 is secured in any conventional fashion to the front portion 76 so as to permit the rear portion 78 to move above the outer roof panel 32 as shown in FIG. 3 to the externally retracted position.

With the construction of the sunroof assembly 14 as described above, maximum roof opening is achieved while still permitting storage of the sunroof 70 on the vehicle roof as opposed to removal from the vehicle roof as is done with other types of sunroof assemblies.

As previously mentioned, the outer roof panel 32 is cut to define the roof opening 60 and permit mounting of the sunroof 70 on the roof 12. This cutting of the outer roof panel is done after the initial vehicle assembly and without any other structural removal from the roof so as to maintain the strength of the vehicle body.

While the best mode for carrying out the invention has been described in detail, those familiar with the art to which this invention relates will recognize various alternative embodiments and designs for carrying out the invention as defined by the following claims.

What is claimed is:

1. In a vehicle body including an outer roof panel having side edges and also having inner rails that cooperate with the side edges of the outer roof panel to provide a pair of hollow side rails, and side doors having upper edges located adjacent the side edges of the outer roof panel, an externally retractable sunroof assembly comprising: a roof opening in the outer roof panel; said roof opening having forward and rearward edges and having side edges exposing the interior of the side rails of the roof; a track mounted within each side rail; and a sunroof having side edge portions extending over the side rails and being respectively mounted by the tracks therein for movement between a closed position closing the roof opening and an externally retracted position above the outer roof panel to the rear of the roof opening to thereby open the roof opening, and the sunroof having the side edge portions thereof respectively juxtaposed with respect to the upper edges of the closed side doors to provide a continuous door-to-door appearance.

2. A sunroof assembly as in claim 1 wherein the sunroof is made of glass.

3. A sunroof assembly as in claim 1 wherein the sunroof is made of metal.

4. A sunroof assembly as in claim 1 wherein the roof opening and sunroof have a longitudinal length that is a major portion of the longitudinal length of the roof.

5. A sunroof assembly as in claim 4 wherein the sunroof has a front portion that overlaps the rearward edge of the roof opening in the retracted position, and the sunroof having a rear portion that extends to generally adjacent the rear extremity of the roof in the retracted position.

6. A sunroof assembly as claim 1, wherein the outer roof panel is cut to define the roof opening.

7. In a vehicle body including a front windshield header and a roof including an outer roof panel having side edges and also including inner rails that cooperate with the side edges of the outer roof panel to provide a pair of hollow side rails, and side doors having upper edges located adjacent the side edges of the outer roof panel with the side doors in a closed position, an externally retractable sunroof assembly comprising: a roof opening in the outer roof panel; said roof opening having a forward edge adjacent the windshield header and a rearward edge spaced rearwardly from the forward edge by a major portion of the longitudinal length of the roof; said roof opening also having side edges extending between the forward and rearward edges thereof and exposing the interior of the side rails of the roof; a track mounted within each side rail; a sunroof having a longitudinal length corresponding to the longitudinal length of the roof opening and having side edge portions respectively extending over the side rails; said side edge portions of the sunroof being respectively mounted by the tracks for movement of the sunroof between a closed position closing the roof opening and an externally retracted position above the outer roof panel to the rear of the roof opening to thereby open the roof opening; the sunroof in the closed position extending rearwardly from the windshield header and having its side edge portions juxtaposed with respect to the upper edges of the closed side doors to provide a continuous door-to-door appearance; and the sunroof having a front portion that overlaps the rearward edge of the roof opening in the retracted position and having a rear portion that extends to generally adjacent the rear extremity of the roof in the retracted position.

* * * * *